United States Patent
Naito et al.

(10) Patent No.: US 8,908,695 B2
(45) Date of Patent: Dec. 9, 2014

(54) WIRELESS COMMUNICATION DEVICE, PROGRAM, WIRELESS COMMUNICATION METHOD, AND WIRELESS COMMUNICATION SYSTEM

(75) Inventors: Masahiko Naito, Tokyo (JP); Masanori Sato, Tokyo (JP); Erika Saito, Tokyo (JP)

(73) Assignee: Sony Corporation, Tokyo (JP)

( * ) Notice: Subject to any disclaimer, the term of this patent is extended or adjusted under 35 U.S.C. 154(b) by 364 days.

(21) Appl. No.: 13/005,725

(22) Filed: Jan. 13, 2011

(65) Prior Publication Data

US 2011/0182207 A1 Jul. 28, 2011

(30) Foreign Application Priority Data

Jan. 22, 2010 (JP) ................................ 2010-012110

(51) Int. Cl.
| | | |
|---|---|---|
| H04L 12/28 | (2006.01) | |
| H04W 8/18 | (2009.01) | |
| H04W 8/00 | (2009.01) | |
| H04W 4/08 | (2009.01) | |
| H04L 29/06 | (2006.01) | |
| H04W 12/08 | (2009.01) | |

(52) U.S. Cl.
CPC ............. *H04W 8/005* (2013.01); *H04W 8/186* (2013.01); *H04L 63/104* (2013.01); *H04W 4/08* (2013.01); *H04W 12/08* (2013.01)
USPC ......................... 370/395.2; 370/328; 370/338

(58) Field of Classification Search
None
See application file for complete search history.

(56) References Cited

U.S. PATENT DOCUMENTS

| | | | |
|---|---|---|---|
| 6,657,981 B1* | 12/2003 | Lee et al. ...................... 370/331 |
| 7,215,677 B2* | 5/2007 | Lung ............................. 370/400 |
| 7,554,979 B2* | 6/2009 | Ikeda ............................ 370/389 |
| 7,567,819 B2* | 7/2009 | Alone et al. ............... 455/552.1 |
| 7,907,562 B2* | 3/2011 | Murty et al. .................. 370/328 |
| 8,180,328 B2* | 5/2012 | Van De Groenendaal .... 455/411 |
| 2007/0201420 A1* | 8/2007 | Tejaswini et al. ............. 370/338 |
| 2008/0026795 A1* | 1/2008 | Fujii ............................. 455/561 |
| 2008/0198826 A1* | 8/2008 | Won ............................. 370/338 |
| 2009/0049519 A1* | 2/2009 | Uno et al. ........................ 726/3 |
| 2010/0124213 A1* | 5/2010 | Ise et al. ....................... 370/338 |
| 2010/0309815 A1* | 12/2010 | Yepez et al. .................. 370/254 |
| 2011/0069832 A1* | 3/2011 | Tang ................................ 380/1 |
| 2012/0147870 A1* | 6/2012 | Galanis et al. ............... 370/338 |

FOREIGN PATENT DOCUMENTS

JP 2006-229775 A 8/2006

OTHER PUBLICATIONS

Chinese Office Action issued Jul. 2, 2013 in connection with Chinese Application No. 201110021961.7, and English translation thereof.

* cited by examiner

*Primary Examiner* — Michael J Moore, Jr.
(74) *Attorney, Agent, or Firm* — Wolf, Greenfield & Sacks, P.C.

(57) ABSTRACT

Provided is a wireless communication device including a communication unit, a storage unit that stores information of one wireless communication device forming a same communication group as the wireless communication device, received by the communication unit, and a control unit that discloses the information of the one wireless communication device during an information disclosure period initiated based on user operation for connecting the one wireless communication device forming the communication group and another wireless communication device and does not disclose the information of the one wireless communication device during another period.

9 Claims, 10 Drawing Sheets

WIRELESS COMMUNICATION DEVICE, PROGRAM, WIRELESS COMMUNICATION METHOD, AND WIRELESS COMMUNICATION SYSTEM

CROSS REFERENCE TO RELATED APPLICATIONS

The present application claims priority under 35 U.S.C. §119 to Japanese Patent Application No. JP 2010-012110, filed in the Japan Patent Office on Jan. 22, 2010, the entire contents of which are incorporated herein by reference.

BACKGROUND OF THE INVENTION

1. Field of the Invention

The present invention relates to a wireless communication device, a program, a wireless communication method, and a wireless communication system.

2. Description of the Related Art

A wireless LAN (Local Area Network) system as typified by IEEE (Institute of Electrical and Electronics Engineers) 802.11 is becoming increasingly common in place of a wired network for its advantages such as high flexibility of equipment.

A wireless LAN system standardized by the IEEE 802.11 is composed of groups of wireless communication devices which are an access point operating as a master unit and a plurality of stations operating as slave units, and a plurality of stations are connected to one access point. Note that, when a group identifier (SSID) of the access point is open to the public, the station can easily recognize the existence of the access point with a given SSID located nearby by executing scan and select the access point to which it makes connection.

On the other hand, from the viewpoint of security, there is a need to hide the existence of an access point as well. Therefore, an access point which has a stealth function that intentionally hides SSID (e.g. which transmits a beacon not containing SSID) is proposed. Connection between such an access point and a station is made by setting the same SSID as that of the access point to the station, for example.

Incidentally, according to Wi-Fi Direct under Wi-Fi Alliance standard development, it is proposed to form a communication group by determining which of a group owner and a client each of a plurality of wireless communication devices acts as. The group owner operates as a simplified access point and has a function to connect one or two or more clients.

Further, the group owner has a function to hold information of the client being connected and transmit the information of the client together with information of the group owner in response to a request from another wireless communication device. The function is useful for another wireless communication device to select the client or the group owner to which it makes connection. However, when a communication group is formed within a given home, it is a problem in terms of security that wireless communication devices located in a neighboring home or located outdoors, for example, can acquire information of the whole communication group in the home without restriction.

Concerning this point, Japanese Unexamined Patent Publication No. 2006-229775 discloses a control method that registers equipments onto an access point having the stealth function, so that the access point responds only to a request from the registered equipment and sends SSID to the registered equipment. According to the control method, it is possible to prevent an unregistered equipment from acquiring information (SSID) of the access point.

SUMMARY OF THE INVENTION

However, according to the above-described control method, each time connecting a new wireless equipment to the access point, it is necessary for a user to register the wireless equipment onto the access point, which is troublesome for the user.

In light of the foregoing, it is desirable to provide novel and improved wireless communication device, program, wireless communication method, and wireless communication system that can improve the security of information of a communication group with reduced trouble to a user.

According to an embodiment of the present invention, there is provided a wireless communication device including a communication unit, a storage unit that stores information of one wireless communication device forming a same communication group as the wireless communication device, received by the communication unit, and a control unit that discloses the information of the one wireless communication device during an information disclosure period initiated based on user operation for connecting the one wireless communication device forming the communication group and another wireless communication device, and does not disclose the information of the one wireless communication device during another period.

The control unit may initiate the information disclosure period when a signal transmitted from said one wireless communication device based on the user operation on said one wireless communication device is received by the communication unit.

The control unit may measure an elapsed time from initiation of the information disclosure period and, after a predetermined time is elapsed, terminates the information disclosure period.

The control unit may terminate the information disclosure period when a connection process between said one wireless communication device and said another wireless communication device reaches a predetermined stage.

The control unit may terminate the information disclosure period when a signal transmitted from said one wireless communication device based on completion of connection between said one wireless communication device and said another wireless communication device is received by the communication unit.

The control unit may terminate the information disclosure period when a signal transmitted from said one wireless communication device after transmission and reception of a connection permission message between said one wireless communication device and said another wireless communication device is received by the communication unit.

When the wireless communication device forms a same communication group with a plurality of wireless communication devices and the storage unit stores information of the plurality of wireless communication devices, the control unit may disclose only information of said one wireless communication device on which the user operation is performed among the information of the plurality of wireless communication devices.

When the user operation is performed on the wireless communication device, the control unit may initiate the information disclosure period, measures an elapsed time from initiation of the information disclosure period and, after a predetermined time is elapsed, terminate the information disclosure period.

According to another embodiment of the present invention, there is provided a program causing a computer to function as a wireless communication device including a communication unit, a storage unit that stores information of one wireless communication device forming a same communication group as the wireless communication device, received by the communication unit, and a control unit that discloses the information of the one wireless communication device during an information disclosure period initiated based on user operation for connecting the one wireless communication device forming the communication group and another wireless communication device, and does not disclose the information of the one wireless communication device during another period.

According to another embodiment of the present invention, there is provided a wireless communication method including steps of receiving, by a wireless communication device, information of one wireless communication device forming a same communication group as the wireless communication device, recording the information of the one wireless communication device into a storage medium, and disclosing the information of the one wireless communication device during an information disclosure period initiated based on user operation for connecting the one wireless communication device forming the communication group and another wireless communication device, and not disclosing the information of the one wireless communication device during another period.

According to another embodiment of the present invention, there is provided a wireless communication system including a first wireless communication device, and a second wireless communication device forming a same communication group as the first wireless communication device. The first wireless communication device transmits a signal to the second wireless communication device upon detecting user operation for making connection to another wireless communication device. The second wireless communication device includes a communication unit, a storage unit that stores information of the first wireless communication device received by the communication unit, and a control unit that discloses the information of the first wireless communication device during an information disclosure period initiated based on receiving the signal from the first wireless communication device, and does not disclose the information of the first wireless communication device during another period.

According to the embodiments of the present invention described above, it is possible to improve the security of information of a communication group with reduced trouble to a user.

DETAILED DESCRIPTION OF THE EMBODIMENT(S)

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In this specification and the drawings, each of a plurality of structural elements having substantially the same function is distinguished by affixing a different alphabetical letter to the same reference numeral in some cases. For example, a plurality of structural elements having substantially the same function are distinguished like wireless communication devices 20A, 20B and 20C where necessary. However, when there is no particular need to distinguish between a plurality of structural elements having substantially the same function, they are denoted only by the same reference numeral. For example, when there is no particular need to distinguish between the wireless communication devices 20A, 20B and 20C, they are referred to simply as the wireless communication device 20.

Preferred embodiments of the present invention will be described hereinafter in the following order.
1. Scope of Embodiment of Present Invention
2. Configuration of Wireless Communication Device
3. First Operation Example
4. Second Operation Example
5. Third Operation Example
6. Fourth Operation Example
7. Fifth Operation Example
8. Summary 1. Scope of Embodiment of Present Invention First, a scope of an embodiment of the present invention is described hereinafter with reference to FIGS. 1 to 3.

Figure 1:
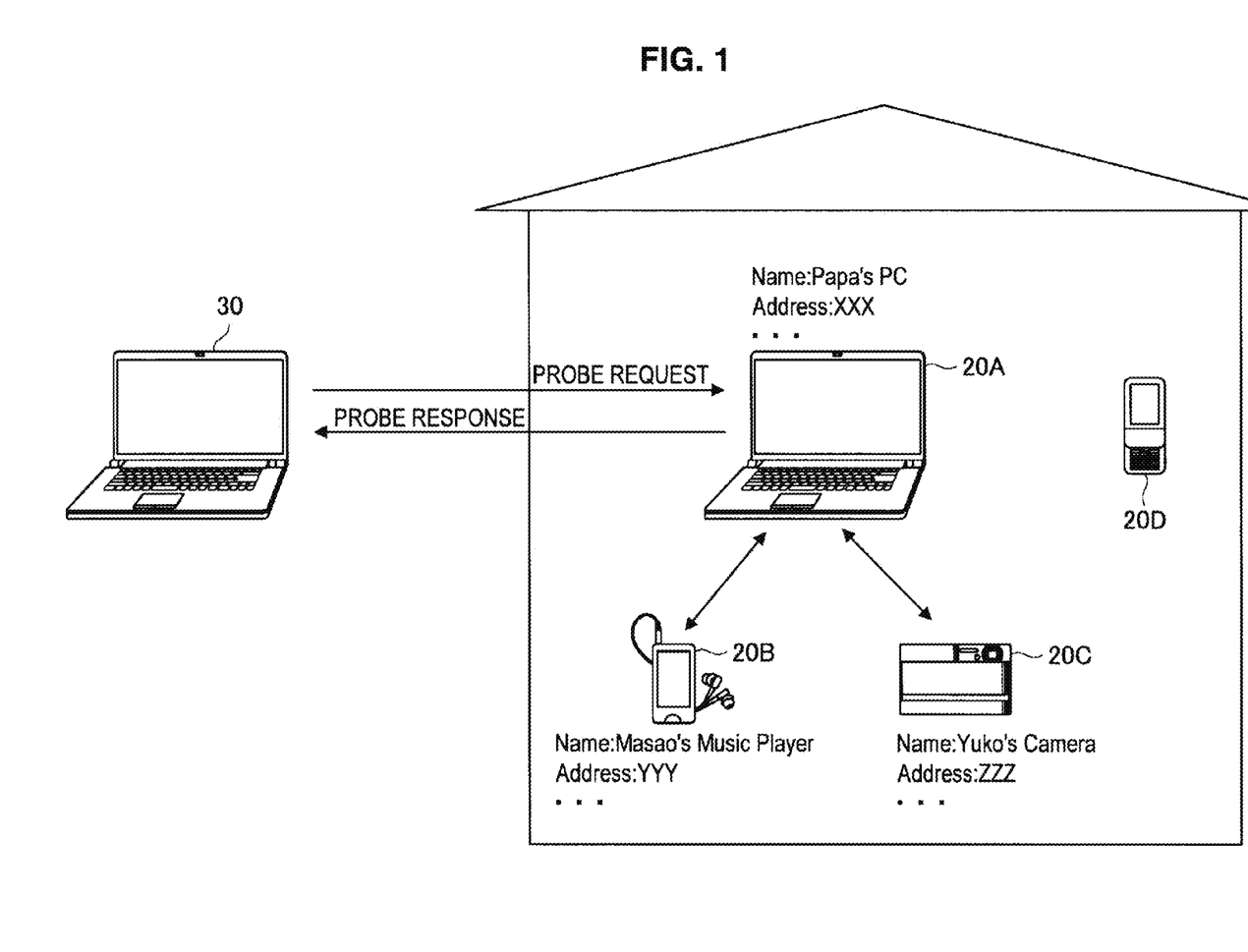
FIG. 1 is an explanatory view showing an exemplary layout of wireless communication devices according to an embodiment of the present invention.

FIG. 1 is an explanatory view showing an exemplary layout of wireless communication devices 20 according to an embodiment of the present invention. In the example shown in FIG. 1, wireless communication devices 20A to 20D are placed within a given home. The wireless communication device 20A is connected with the wireless communication devices 20B and 20C and forms a communication group together with the wireless communication devices 20B and 20C. The wireless communication device 20D is an unconnected equipment which is not connected with any device.

The wireless communication device 20A acts as a group owner that manages communication in the communication group, and the wireless communication devices 20B and 20C act as clients. Note that each wireless communication device 20 may have both of the function to act as the group owner and the function to act as the client and determine a role of either acting as the group owner or as the client by negotiation in a connection process.

Further, although a PC (Personal Computer) is illustrated as the wireless communication device 20A, a portable music playing device is illustrated as the wireless communication device 20B, an imaging device is illustrated as the wireless communication device 20C, and a mobile phone is illustrated as the wireless communication device 20D in FIG. 1, the wireless communication device 20 is not limited to such examples. For example, the wireless communication device 20 may be an information processing device such as a home video processing device (e.g. a DVD recorder, a videocassette recorder etc.), a PDA (Personal Digital Assistants), a home game device, an electrical household appliance, a portable video processing device, or a portable game device.

Further, as shown in FIG. 1, each wireless communication device 20 has information such as an address and a name. For example, the name of the wireless communication device 20A is "Papa's PC", the name of the wireless communication device 20B is "Masao's Music Player", and the name of the wireless communication device 20C is "Yuko's Camera".

Figure 2:
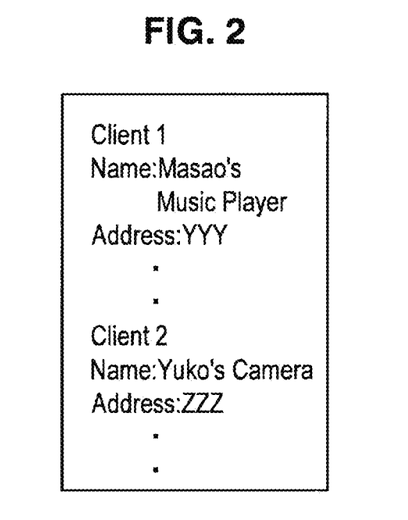
FIG. 2 is an explanatory view showing a specific example of information of a communication group held by a wireless communication device.

The wireless communication device 20A which acts as the group owner receives the above-described information from the wireless communication devices 20B and 20C being connected which act as the clients and stores the received information as information of the communication group onto a memory as shown in FIG. 2.

Figure 3:
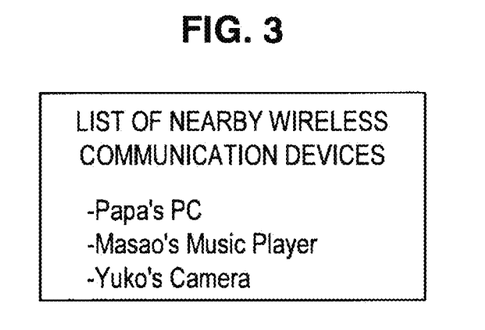
FIG. 3 is an explanatory view showing a specific example of a list of wireless communication devices existing nearby.

At the time when the wireless communication device 20D, which is an unconnected equipment, makes connection to a nearby wireless communication device, if the wireless communication device 20A discloses the information of the communication group, the wireless communication device 20D can acquire a list of nearby wireless communication devices as shown in FIG. 3 from the wireless communication device 20A and easily select a device to which it makes connection.

On the other hand, if the wireless communication device 20A responds to a probe request packet from a third party such as a wireless communication device 30 and transmits a probe response packet containing the information of the communication group without restriction, the third party wireless communication device 30 can easily acquire information of another communication group, which raises a concern about the issue of security.

Under such a background, the wireless communication device 20 according to an embodiment of the present invention has been invented. The wireless communication device 20 according to the embodiment of the present invention can improve the security of information of a communication group with reduced trouble to a user. Specifically, the wireless communication device 20 discloses information of a communication group only during an information disclosure period which is initiated based on user operation for connecting one wireless communication device and another wireless communication device that form the identical communication group. Hereinafter, the configuration of the wireless communication device 20 is described in detail.

2. Configuration of Wireless Communication Device

Figure 4:
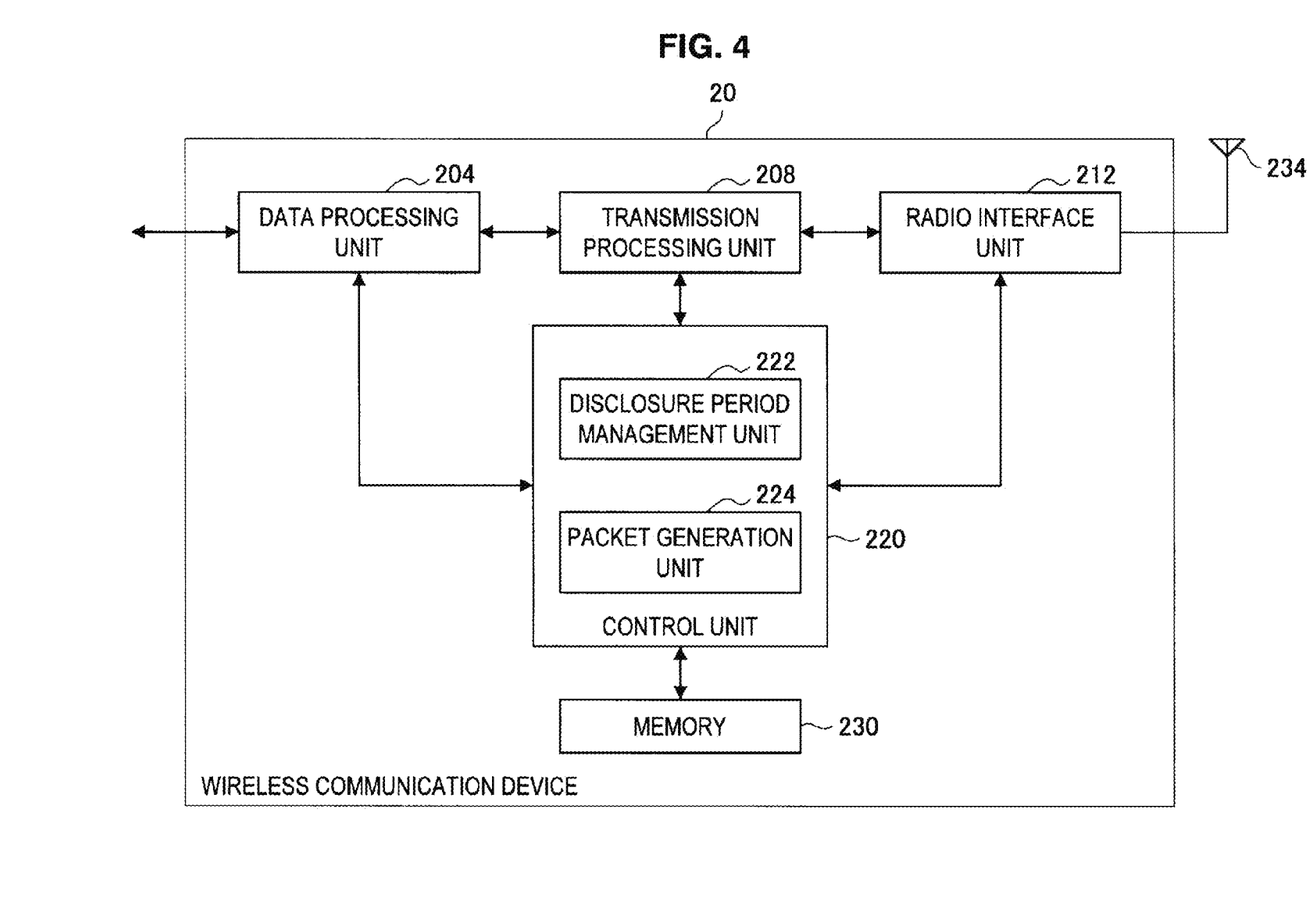
FIG. 4 is a functional block diagram showing a configuration of a wireless communication device according to an embodiment of the present invention.

FIG. 4 is a functional block diagram showing the configuration of the wireless communication device 20 according to the embodiment of the present invention. Referring to FIG. 4, the wireless communication device 20 includes a data processing unit 204, a transmission processing unit 208, a radio interface unit 212, a control unit 220, a memory 230, and an antenna 234.

In a transmitting operation, the data processing unit 204 creates various data frames and data packets in response to a request from an upper layer, for example, and supplies them to the transmission processing unit 208. The transmission processing unit 208 performs, during transmission, processing such as addition of various data headers or an error detecting code such as FCS (Frame Check Sequence) to the packets created by the data processing unit 204 and then provides the processed data to the radio interface unit 212. The radio interface unit 212 generates a modulation signal in a frequency band of a carrier wave from the data received from the transmission processing unit 208 and transmits the signal as a radio signal from the antenna 234.

Further, in a receiving operation, the radio interface unit 212 performs down-conversion of a radio signal received by the antenna 234 and converts the signal into a bit string to thereby decode various data frames. The transmission processing unit 208 analyzes headers added to the various data frames supplied from the radio interface unit 212 and, confirming that there is no error in the data frames based on the error detecting code, supplies the various data frames to the data processing unit 204. The data processing unit 204 processes and analyzes the various data frames and data packets supplied from the transmission processing unit 208. In this manner, the data processing unit 204, the transmission processing unit 208, the radio interface unit 212 and the antenna 234 function as a communication unit.

The control unit 220 controls the receiving operation and the transmitting operation of the data processing unit 204, the transmission processing unit 208, and the radio interface unit 212. For example, the control unit 220 determines a use frequency, makes an instruction to create and transmit control messages such as a beacon (when operating as the group owner) or an acknowledgement of a beacon (when operating as the client), interprets control messages and so on. Further, when operating as the group owner, the control unit 220 records information (MAC address, device type, name, capability information etc.) of a wireless communication device which is received from the wireless communication device operating as the client into the memory 230 as information of a communication group.

Further, the control unit 220 has functions as a disclosure period management unit 222 and a packet generation unit 224. The disclosure period management unit 222 manages the information disclosure period for disclosing the information of the communication group stored in the memory 230. Specifically, the disclosure period management unit 222 manages the start and end of the information disclosure period or the like.

The packet generation unit 224 receives a probe request packet and, when it is the information disclosure period, makes an instruction to create and transmit a probe response packet which contains the information of the communication group. Specifically, during the information disclosure period, the packet generation unit 224 discloses the information of the communication group.

On the other hand, the packet generation unit 224 receives a probe request packet and, when it is a period different from the information disclosure period, makes an instruction to create and transmit a probe response packet which does not contains the information of the communication group. Specifically, during a period different from the information disclosure period, the packet generation unit 224 does not disclose at least part of the information of the communication group which is disclosed during the information disclosure period. Further, the packet generation unit 224 also makes an instruction to create and transmit a disclosure OK signal and a disclosure NG signal, which are described later. The disclosure period management unit 222, the packet generation unit 224, and the information disclosure period are described in detail later in "3. First Operation Example" and subsequent sections.

The memory 230 (storage unit) has a role of a working area of data processing by the control unit 220 and a function of a storage medium that stores various kinds of data such as the information of the communication group. The memory 230 may be a storage medium such as nonvolatile memory, a magnetic disk, an optical disc or an MO (Magneto Optical) disk. Examples of the nonvolatile memory are EEPROM (Electrically Erasable Programmable Read-Only Memory), EPROM (Erasable Programmable ROM) and so on. Examples of the magnetic disk are a hard disk, a discoid magnetic disk and so on. Examples of the optical disc are CD (Compact Disc), DVD-R (Digital Versatile Disc Recordable), BD (Blu-ray Disc®) and so on.

3. First Operation Example

The configuration of the wireless communication device 20 according to the embodiment of the present invention is described above with reference to FIG. 4. Hereinafter, a first operation example of the present invention is described with reference to FIGS. 5 to 7.

Figure 5:
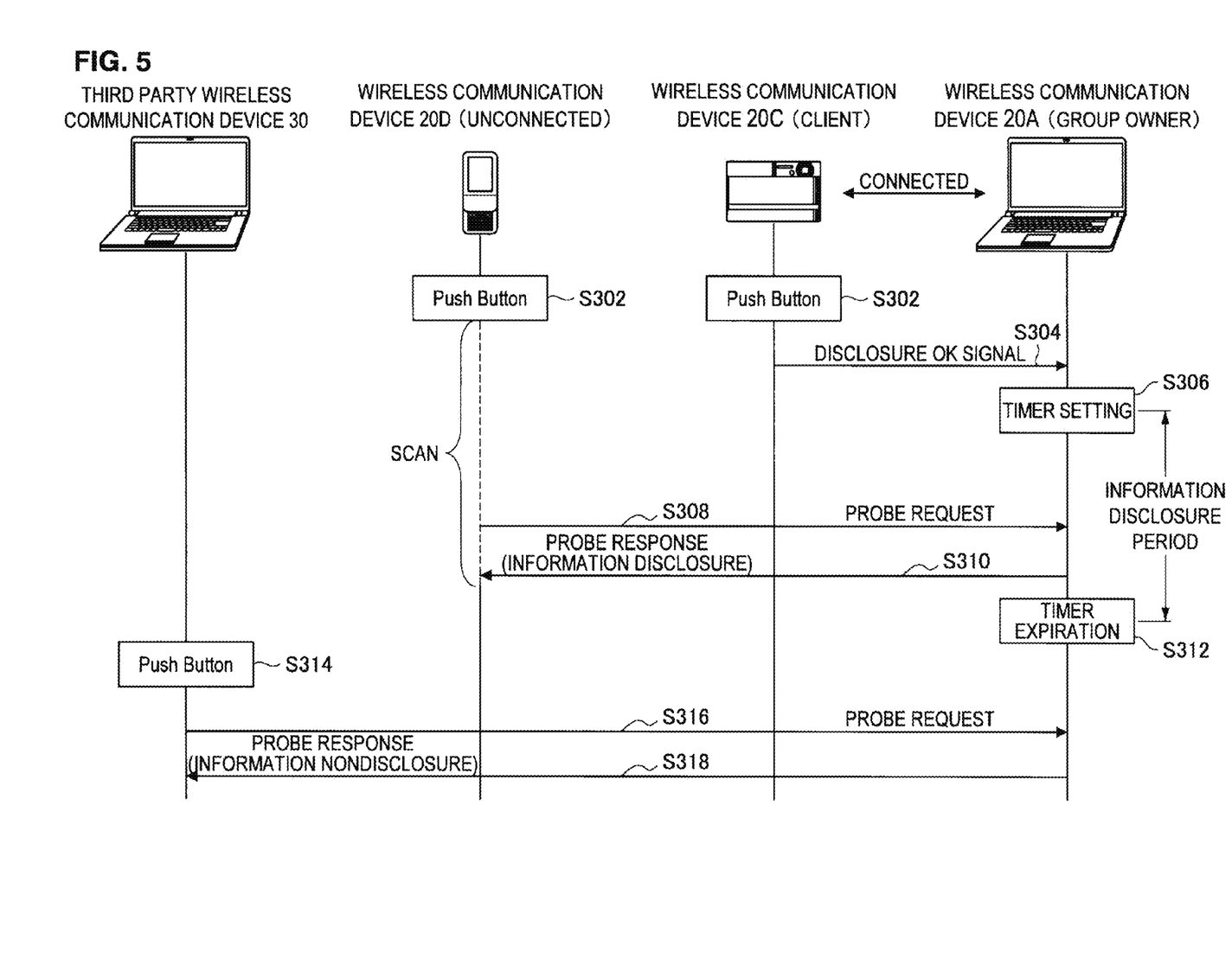
FIG. 5 is a sequence chart showing a first operation example of the present invention.

FIG. 5 is a sequence chart showing the first operation example of the present invention. In FIG. 5, it is assumed that the wireless communication device 20A which acts as the group owner and the wireless communication device 20C which acts as the client are being connected, and the wireless communication device 20A stores information of the wireless communication device 20C in the memory 230.

When push buttons of the wireless communication device 20C and the wireless communication device 20D are pressed as user operation which serves as a trigger to connect the wireless communication device 20C and the wireless communication device 20D (S302), the wireless communication device 20D starts active scan for checking the environmental conditions.

Note that the push button may be physically mounted on the wireless communication device 20 or displayed on a screen in a selectable manner. Further, the push button may be a WPS push button or another dedicated button, for example. Further, the user operation may be pressing of the push button and PIN input. Furthermore, user's operation on an application, rather than the push button, may be used instead (for example, operation to activate a connection application may be treated to correspond to the pressing of the push button). The active scan is operation in which the wireless communication device 20D transmits the probe request at all available frequencies and waits for a probe response for a given length of time.

When the push button is pressed, the wireless communication device 20C transmits a disclosure OK signal to the wireless communication device 20A being connected which acts as the group owner (S304). Upon receiving the disclosure OK signal, the disclosure period management unit 222 of the wireless communication device 20A sets a timer which expires after a predetermined length of time and initiates the information disclosure period (S306). Specifically, the disclosure period management unit 222 initiates the information disclosure period in conjunction with user operation for connecting the wireless communication device 20C and the wireless communication device 20D. The structure of the disclosure OK signal is described hereinafter with reference to FIG. 6.

Figure 6:
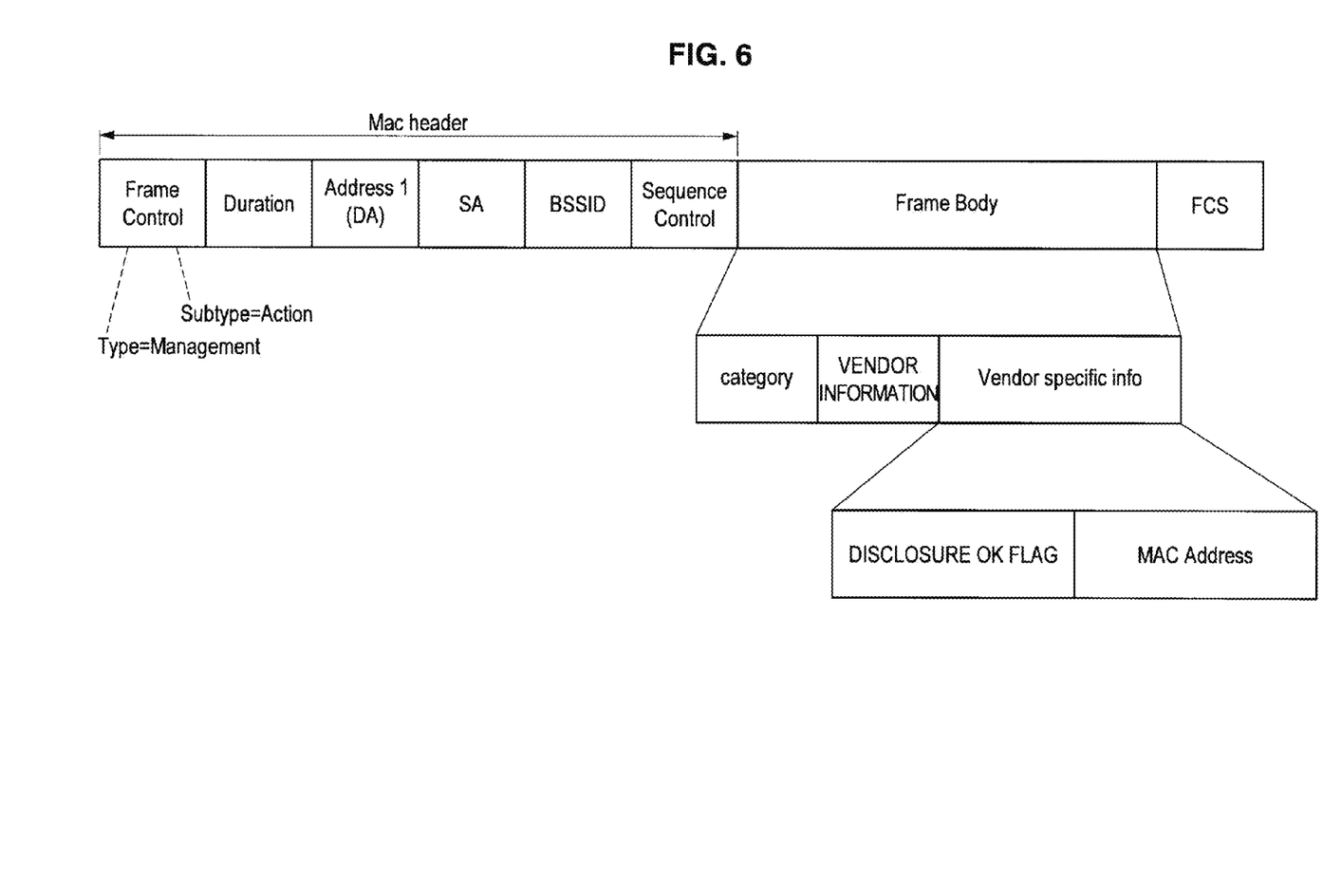
FIG. 6 is an explanatory view showing an exemplary structure of a disclosure OK signal.

FIG. 6 is an explanatory view showing an exemplary structure of the disclosure OK signal. Referring to FIG. 6, the disclosure OK signal includes MAC header, Frame body and FCS, and it may be Action Frame defined by the IEEE 802.11. Specifically, in the Frame Control field of the MAC header, "Management" is described in Type, and "Action" is described in Subtype.

Further, in the category contained in the Frame body, "0×DD" indicating an independent frame defined by the vendor is described, and a type of information defined by the vendor is described in the vendor information. Further, in the Vendor specific info, a disclosure OK flag and a MAC address of a transmission source device are described.

The wireless communication device 20A discloses the information of the communication group that is stored in the memory 230 during the information disclosure period which is initiated based on the above-described disclosure OK signal. Specifically, when a probe request is received from the wireless communication device 20D during the information disclosure period (S308), the wireless communication device 20A sends a probe response containing the information of the communication group generated by the packet generation unit 224 back to the wireless communication device 20D (S310).

Thus, based on the information of the communication group received from the wireless communication device 20A, the wireless communication device 20D can recognize the existence of the wireless communication devices 20A and 20C located nearby and display information of the wireless communication devices 20A and 20C. Then, after the wireless communication device 20C is selected as a device to which it makes connection by a user through a display screen, the wireless communication device 20D starts a connection process with the wireless communication device 20C.

Note that, even when the wireless communication device 20A has information of a plurality of wireless communication devices, the packet generation unit 224 may generate a probe response which contains only information of the wireless communication device 20C which is a transmission source of the disclosure OK signal indicated by the MAC address of the disclosure OK signal. This prevents the information of the whole communication group from leaking during the information disclosure period as well, thereby enhancing security.

When the timer set in S306 expires (S312), the disclosure period management unit 222 terminates the information disclosure period. Therefore, even when the push button is pressed in the third party wireless communication device 30 (S314), and a probe request is received from the third party wireless communication device 30 (S316), the wireless communication device 20A does not disclose the information of the communication group. This prevents the information of the communication group from leaking to the third party wireless communication device 30 without restriction.

Note that a way of not disclosing the information of the communication group is not particularly limited. For example, the packet generation unit 224 may generate a probe response which does not contain the information of the communication group, and the wireless communication device 20A may send the probe response generated by the packet generation unit 224 back to the third party wireless communication device 30 (S318). Specifically, although the probe response may formally contain an information element of the wireless communication device 20C, the content of the information element may be substantially empty. Alternatively, the wireless communication device 20A may refrain from sending a probe response even when it receives a probe request during a period different from the information disclosure period.

Figure 7:
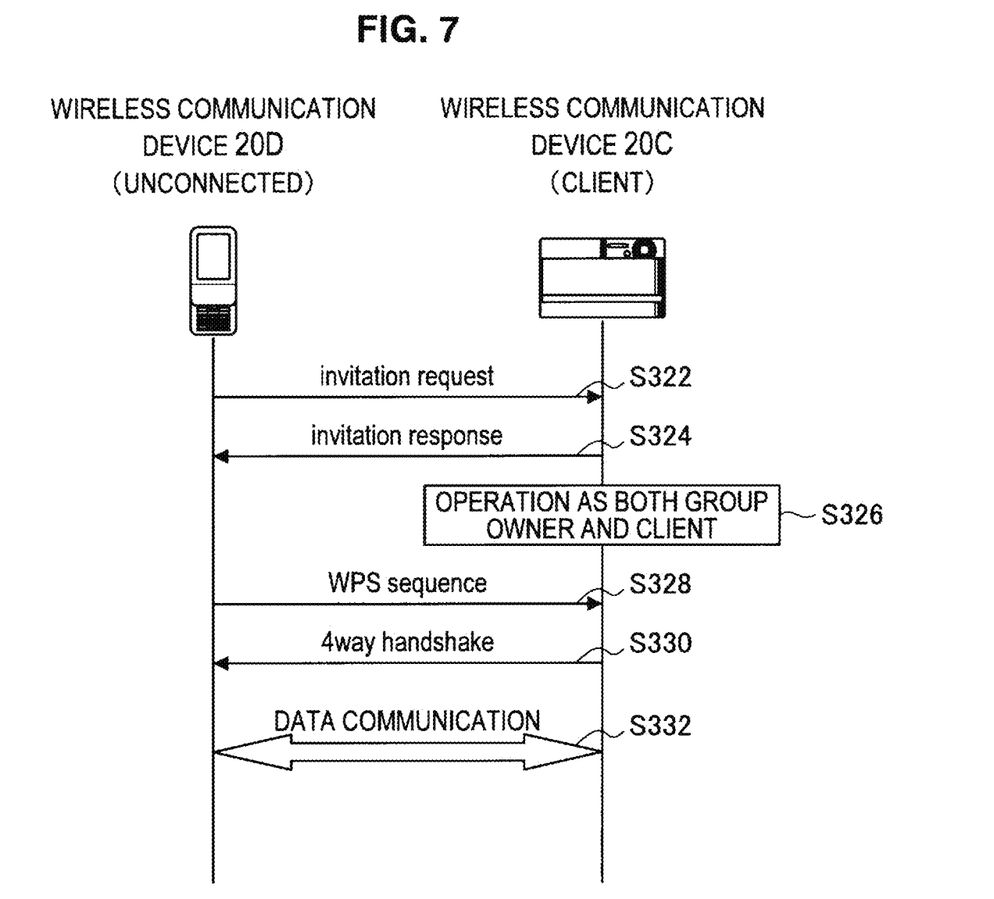
FIG. 7 is a sequence chart showing a connection process between wireless communication devices.

Because the wireless communication device 20D acquires the address of the wireless communication device 20C in S310, the wireless communication device 20D can make connection to the wireless communication device 20C by a connection process shown in FIG. 7, for example.

FIG. 7 is a sequence chart showing a connection process between the wireless communication devices 20. Referring to FIG. 7, the wireless communication device 20D sends an invitation request as a connection request message to the wireless communication device 20C (S322). In response to the invitation request, the wireless communication device 20C sends an invitation response as a connection permission message (S324). The wireless communication device 20C thereby operates as the client for the wireless communication device 20A and operates as the group owner for the wireless communication device 20D.

After that, the wireless communication device 20C and the wireless communication device 20D perform encryption setting of a communication path such as WPS sequence and 4way handshake (S328, S330) and starts data communication (S332).

As described above, according to the first operation example of the present invention, the wireless communication device 20A discloses the information of the communication group only during the information disclosure period, thereby enhancing security. Further, the information disclosure period is initiated in conjunction with user operation for connecting the wireless communication device 20C and the wireless communication device 20D, thereby saving the trouble of a user for initiating the information disclosure period.

4. Second Operation Example

Hereinafter, a second operation example of the present invention is described with reference to FIG. 8. The second operation example is different form the first operation example in that the wireless communication device 20A terminates the information disclosure period upon receiving a disclosure NG signal from the wireless communication device 20C, as described in detail below.

Figure 8:
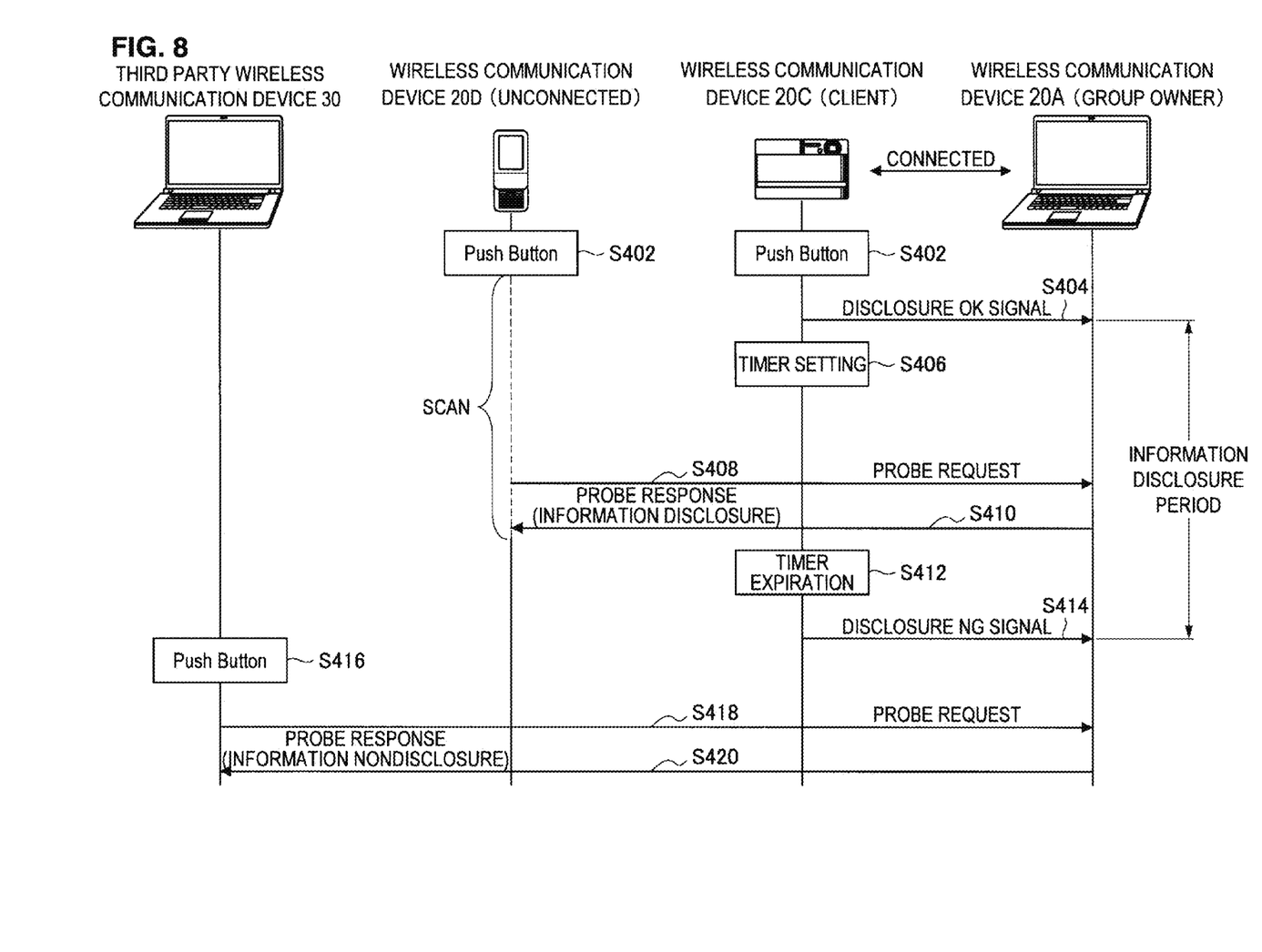
FIG. 8 is a sequence chart showing a second operation example of the present invention.

FIG. 8 is a sequence chart showing the second operation example of the present invention. In FIG. 8, it is assumed that the wireless communication device 20A which acts as the group owner and the wireless communication device 20C which acts as the client are being connected, and the wireless communication device 20A stores information of the wireless communication device 20C in the memory 230.

When push buttons of the wireless communication device 20C and the wireless communication device 20D are pressed as user operation which serves as a trigger to connect the wireless communication device 20C and the wireless communication device 20D (S402), the wireless communication device 20D starts active scan for checking the environmental conditions.

Then, the wireless communication device 20C transmits a disclosure OK signal to the wireless communication device 20A being connected which acts as the group owner (S404), and sets a timer which expires after a predetermined length of time (S406). Upon receiving the disclosure OK signal from the wireless communication device 20C, the disclosure period management unit 222 of the wireless communication device 20A initiates the information disclosure period.

Therefore, when a probe request is received from the wireless communication device 20D during the information disclosure period (S408), the wireless communication device 20A sends a probe response containing the information of the communication group which is generated by the packet generation unit 224 back to the wireless communication device 20D (S410).

After that, when the timer set in S406 expires (S412), the wireless communication device 20C transmits a disclosure NG signal to the wireless communication device 20A (S414). Upon receiving the disclosure NG signal from the wireless communication device 20C, the disclosure period management unit 222 of the wireless communication device 20A terminates the information disclosure period.

Therefore, even when the push button is pressed in the third party wireless communication device 30 (S416), and a probe request is received from the third party wireless communication device 30 (S418), the wireless communication device 20A sends a probe response which does not contain the information of the communication group back.

Note that the disclosure NG signal may be the Action Frame defined by the IEEE 802.11, for example, just like the disclosure OK signal described earlier with reference to FIG. 6. Further, the disclosure NG signal may be such that "disclosure OK flag" is replaced by "disclosure NG flag" in the frame structure shown in FIG. 6.

As described above, the same advantageous effects as those of the first operation example can be obtained when the wireless communication device 20C acting as the client, rather than the wireless communication device 20A acting as the group owner, manages the timer for terminating the information disclosure period.

5. Third Operation Example

Hereinafter, a third operation example of the present invention is described with reference to FIG. 9. The third operation example is different form the first operation example in that the wireless communication device 20A acting as the group owner is a target of connection with the wireless communication device 20D, as described in detail below.

Figure 9:
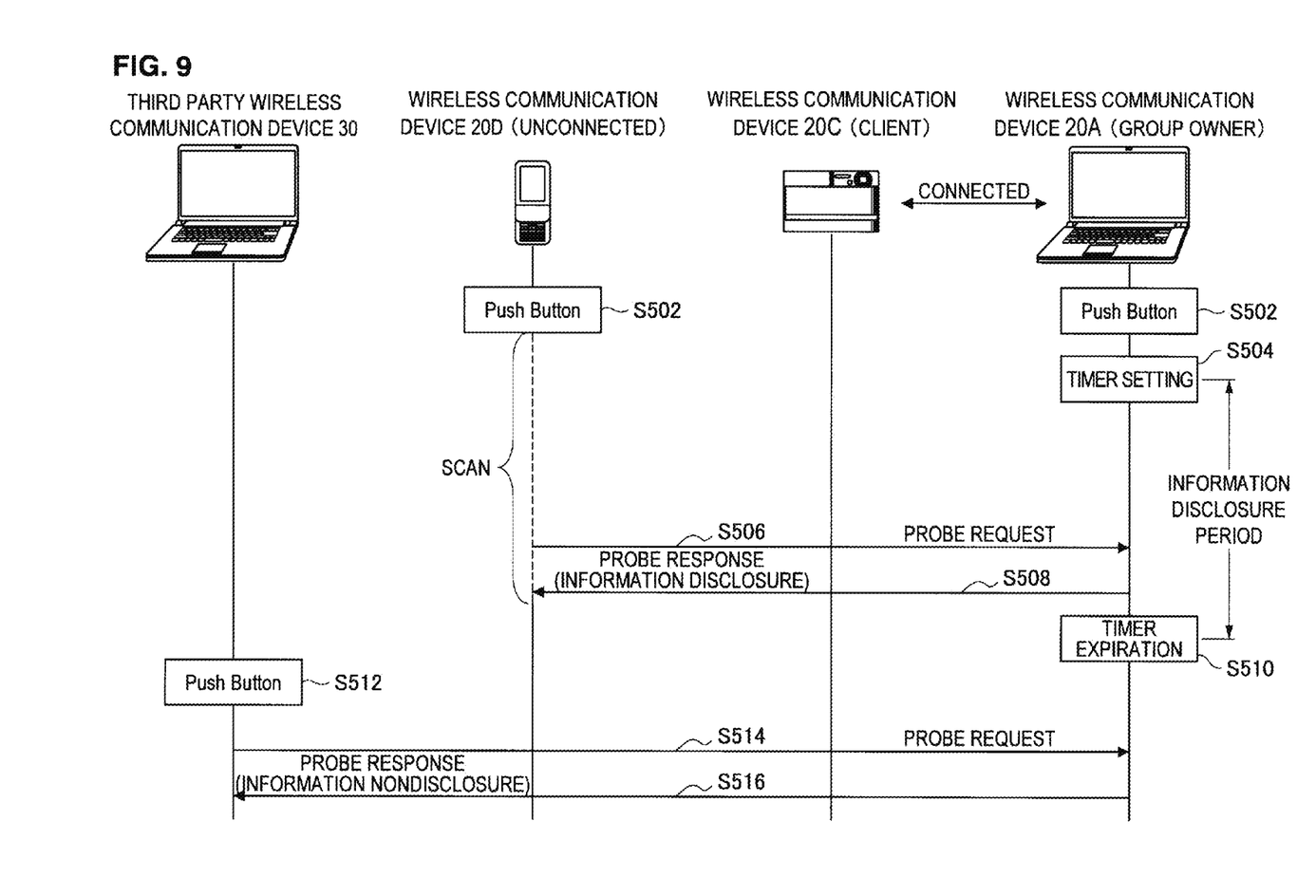
FIG. 9 is a sequence chart showing a third operation example of the present invention.

FIG. 9 is a sequence chart showing the third operation example of the present invention. In FIG. 9, it is assumed that the wireless communication device 20A which acts as the group owner and the wireless communication device 20C which acts as the client are being connected, and the wireless communication device 20A stores information of the wireless communication device 20C in the memory 230.

When push buttons of the wireless communication device 20A and the wireless communication device 20D are pressed as user operation which serves as a trigger to connect the wireless communication device 20A and the wireless communication device 20D (S502), the wireless communication device 20D starts active scan for checking the environmental conditions.

When the push button is pressed, the disclosure period management unit 222 of the wireless communication device 20A sets a timer which expires after a predetermined length of time and initiates the information disclosure period (S504). Specifically, the disclosure period management unit 222 initiates the information disclosure period in conjunction with user operation on the wireless communication device 20A for connecting the wireless communication device 20A and the wireless communication device 20D.

Then, the wireless communication device 20A discloses the information of the communication group stored in the memory 230 during the information disclosure period. Specifically, when a probe request is received from the wireless communication device 20D during the information disclosure period (S506), the wireless communication device 20A sends a probe response containing the information of the communication group which is generated by the packet generation unit 224 back to the wireless communication device 20D (S508).

When the timer set in S506 expires (S510), the disclosure period management unit 222 terminates the information disclosure period. Therefore, even when the push button is pressed in the third party wireless communication device 30 (S512), and a probe request is received from the third party wireless communication device 30 (S514), the wireless communication device 20A does not disclose the information of the communication group (S516). This prevents the information of the communication group from leaking to the third party wireless communication device 30 without restriction.

As described above, when a connection target of the wireless communication device 20D which is an unconnected equipment is the wireless communication device 20A which acts as the group owner as well, the wireless communication device 20A can initiate the information disclosure period based on user operation such as pressing of the push button on the wireless communication device 20A.

6. Fourth Operation Example

Hereinafter, a fourth operation example of the present invention is described with reference to FIG. 10. The fourth operation example is different form the first to third operation examples in that the information disclosure period ends when a connection process between the wireless communication device 20C and the wireless communication device 20D reaches a predetermined stage.

Figure 10:
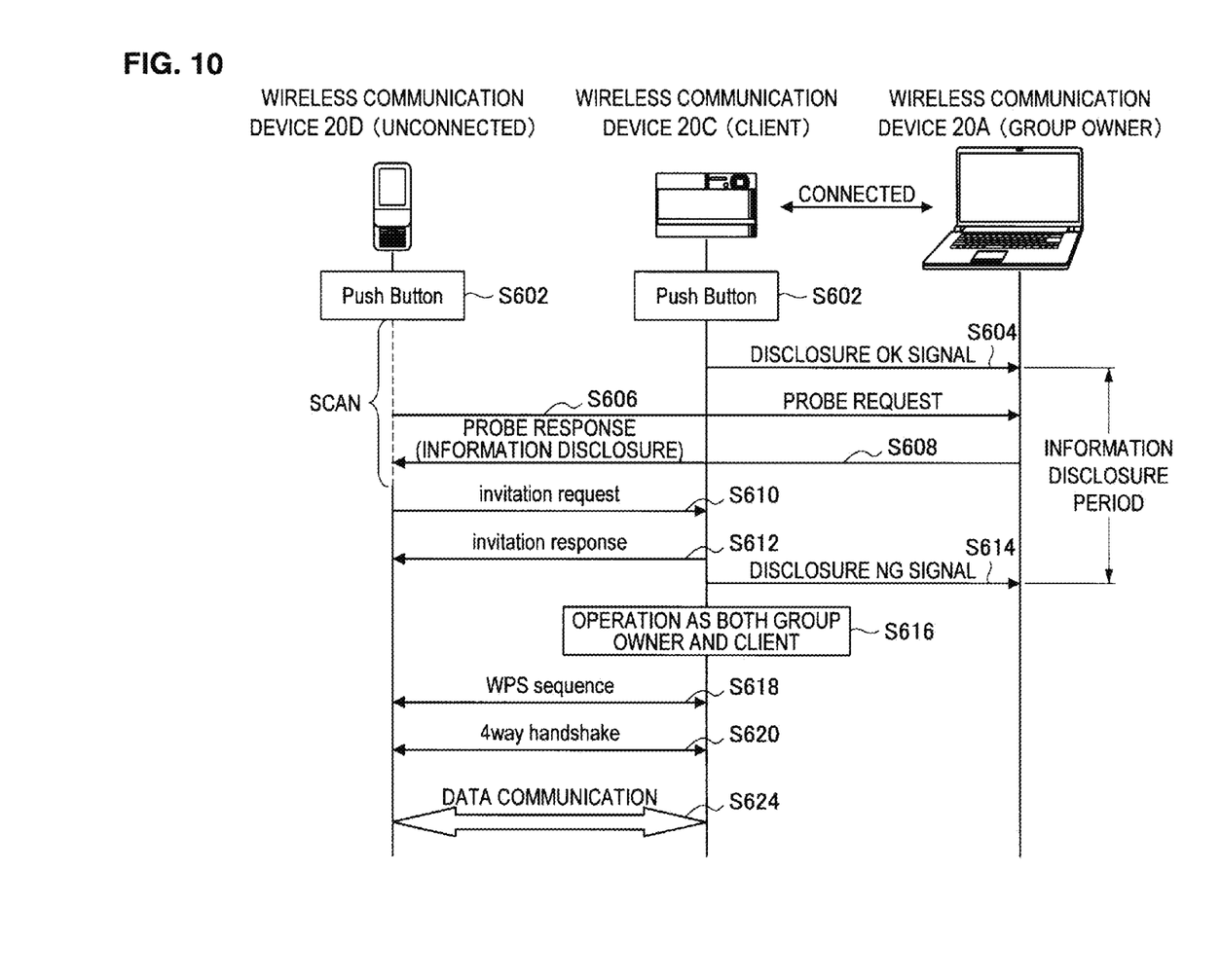
FIG. 10 is a sequence chart showing a fourth operation example of the present invention.

FIG. 10 is a sequence chart showing the fourth operation example of the present invention. In FIG. 10, it is assumed that the wireless communication device 20A which acts as the group owner and the wireless communication device 20C which acts as the client are being connected, and the wireless communication device 20A stores information of the wireless communication device 20C in the memory 230.

When push buttons of the wireless communication device 20C and the wireless communication device 20D are pressed as user operation which serves as a trigger to connect the wireless communication device 20C and the wireless communication device 20D (S602), the wireless communication device 20D starts active scan for checking the environmental conditions.

On the other hand, when the push button is pressed, the wireless communication device 20C transmits a disclosure OK signal to the wireless communication device 20A being connected which acts as the group owner (S604). Upon receiving the disclosure OK signal, the disclosure period management unit 222 of the wireless communication device 20A initiates the information disclosure period.

Then, when a probe request is received from the wireless communication device 20D during the information disclosure period (S606), the wireless communication device 20A sends a probe response containing the information of the communication group which is generated by the packet generation unit 224 back to the wireless communication device 20D (S608).

Then, after the wireless communication device 20C receives an invitation request from the wireless communication device 20D (S610) and sends an invitation response to the wireless communication device 20D (S612), the wireless communication device 20C transmits a disclosure NG signal to the wireless communication device 20A (S614). Upon receiving the disclosure NG signal from the wireless communication device 20C, the disclosure period management unit 222 of the wireless communication device 20A terminates the information disclosure period.

After that, the wireless communication device 20D and the wireless communication device 20C perform encryption setting of a communication path such as WPS sequence and 4way handshake (S618, S620) so that the connection process is completed, and then data communication is started (S624).

As described above, the time to terminate the information disclosure period may be managed according to the progress of the connection process, rather than using the timer.

7. Fifth Operation Example

Hereinafter, a fifth operation example of the present invention is described with reference to FIG. 11. Although the fifth operation example is common to the fourth operation example in that the time to terminate the information disclosure period is managed according to the progress of the connection process, it is different form the fourth operation example in that the information disclosure period is terminated upon completion of the connection process.

Figure 11:
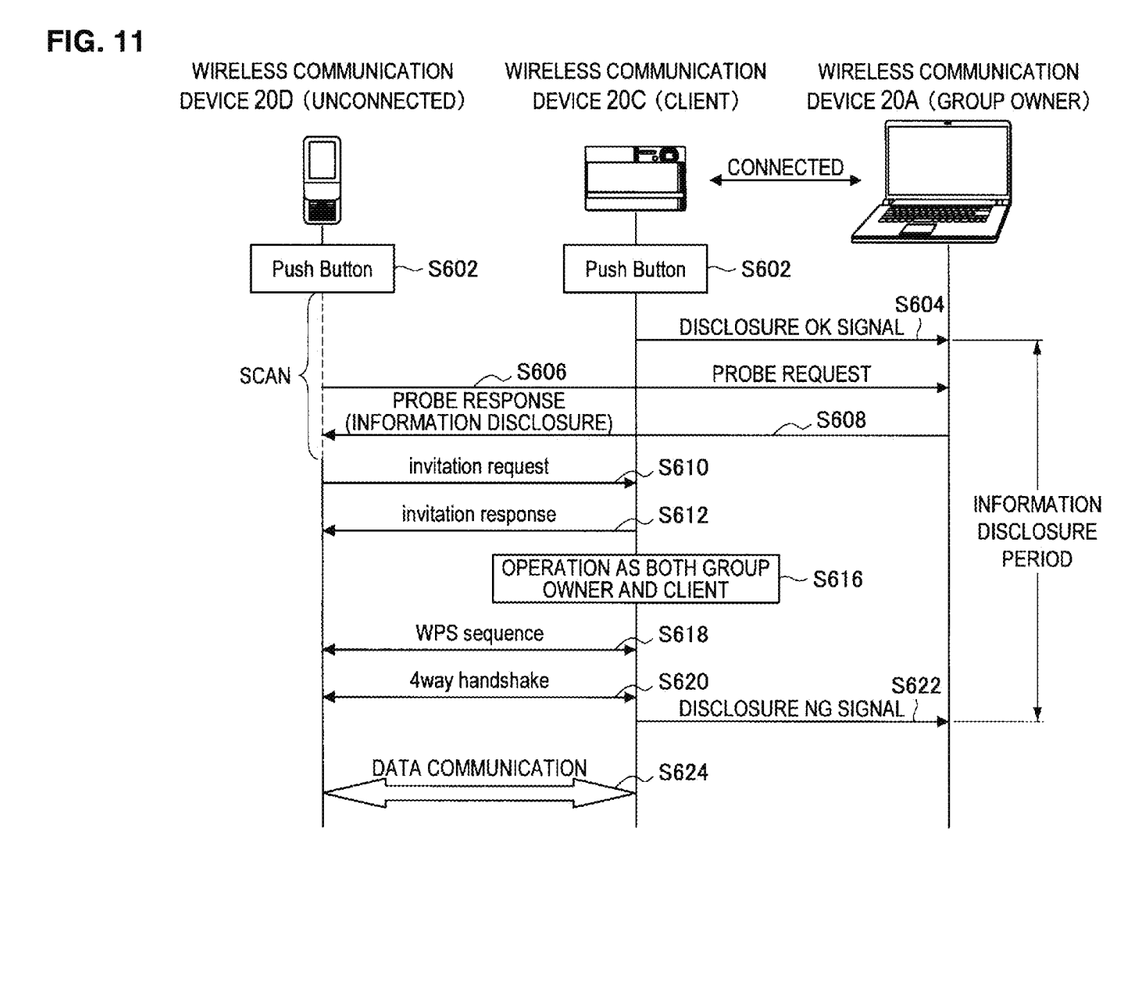
FIG. 11 is a sequence chart showing a fifth operation example of the present invention.

FIG. 11 is a sequence chart showing the fifth operation example of the present invention. In FIG. 11, it is assumed that the wireless communication device 20A which acts as the group owner and the wireless communication device 20C which acts as the client are being connected, and the wireless communication device 20A stores information of the wireless communication device 20C in the memory 230. Further, the process from S602 to S612 is the same as that of the fourth operation example described above with reference to FIG. 10, and it is not redundantly described in detail below.

In the fifth operation example, after the wireless communication device 20C performs encryption setting of a communication path such as WPS sequence and 4way handshake with the wireless communication device 20D and thereby establishes connection with the wireless communication device 20D (S620), the wireless communication device 20C transmits a disclosure NG signal to the wireless communication device 20A (S622). Upon receiving the disclosure NG signal from the wireless communication device 20C, the disclosure period management unit 222 of the wireless communication device 20A terminates the information disclosure period. The wireless communication device 20A thereby does not disclose the information of the communication group in response to a probe request received after that.

As described above, the wireless communication device 20A can terminate the information disclosure period upon completion of the connection process between the wireless communication device 20C being connected which acts as the client and the wireless communication device 20D.

8. Summary

As described above, the wireless communication device 20 according to the embodiment of the present invention discloses the information of the communication group to which it belongs only during the information disclosure period, thereby enhancing security. It is thereby possible to prevent information of a communication group of a certain home from leaking to wireless communication devices located outdoors or in a neighboring home, for example. Further, the wireless communication device 20 can initiate the information disclosure period in conjunction with user operation for connecting one wireless communication device to another wireless communication device within a communication group. Thus, according to the embodiment of the present invention, it is possible to improve the security of information of a communication group with reduced trouble to a user.

Further, the wireless communication device 20 according to the embodiment of the present invention can limit the information disclosure period by terminating the information disclosure period according to the elapsed time from the initiation of the information disclosure period or the progress of the connection process for connecting one wireless communication device to another wireless communication device within a communication group.

Further, the wireless communication device 20 according to the embodiment of the present invention can disclose only information of a wireless communication device within a communication group on which user operation for making connection with another wireless communication device is performed even during the information disclosure period. This prevents the information of the whole communication group from leaking during the information disclosure period as well, thereby further enhancing security.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

Further, it is not always necessary to perform the steps in the processing of the wireless communication device 20 of this specification in chronological order according to the sequence shown in the sequence charts or flowcharts. For example, the steps in the processing of the wireless communication device 20 may be processed in a different sequence from the sequence shown in the flowcharts or may be processed in parallel.

Furthermore, it is possible to create a computer program that causes hardware such as a CPU, ROM and RAM incorporated in the wireless communication device 20 to perform the equal functions to the elements of the wireless communication device 20 described above. Further, a storage medium that stores such a computer program may be provided.

The present application contains subject matter related to that disclosed in Japanese Priority Patent Application JP 2010-012110 filed in the Japan Patent Office on Jan. 22, 2010, the entire content of which is hereby incorporated by reference.

What is claimed is:

1. A wireless communication device, wherein the wireless communication device is a first wireless communication device in a communication group, wherein the communication group includes the first wireless communication device and a second wireless communication device wirelessly connected to the first wireless communication device, the first wireless communication device comprising:
a communication unit configured to:
receive information identifying the second wireless communication device; and
receive a disclosure signal transmitted from the second wireless communication device;
a storage unit configured to store the information identifying the second wireless communication device; and
a control unit configured to:
initiate an information disclosure period in response to receiving an indication of a user operation on the second wireless communication device, wherein the disclosure signal received by the communication unit includes the indication of the user operation;
receive a request from a third wireless communication device that is not part of the communication group;
determine whether the information disclosure period has ended;
disclose the information identifying the second wireless communication device to the third wireless communication device based, at least in part, on the determination of whether the information disclosure period has ended; and
terminate the information disclosure period when a connection process between said second wireless communication device and said third wireless communication device reaches a predetermined stage.

2. The wireless communication device according to claim 1, wherein
the control unit is configured to measure an elapsed time from the initiation of the information disclosure period and, after a predetermined time is elapsed, terminate the information disclosure period.

3. The wireless communication device according to claim 1, wherein
the control unit is configured to terminate the information disclosure period when a signal transmitted from said second wireless communication device based on completion of connection between said second wireless communication device and said third wireless communication device is received by the communication unit.

4. The wireless communication device according to claim 1, wherein
the control unit is configured to terminate the information disclosure period when a signal transmitted from said second wireless communication device after transmission and reception of a connection permission message between said second wireless communication device and said third wireless communication device is received by the communication unit.

5. The wireless communication device according to claim 1, wherein
the communication group includes a plurality of wireless communication devices and the storage unit stores information identifying each of the plurality of wireless communication devices in the communication group, and wherein the control unit is further configured to disclose to the third wireless communication device information identifying only wireless communication devices in the communication group associated with an information disclosure period that has not ended.

6. The wireless communication device according to claim 1, wherein
the control unit is further configured to:
determine that the user operation has been performed on the first wireless communication device;
initiate an information disclosure period for the first wireless communication device;
measure an elapsed time from initiation of the information disclosure period for the first wireless communication device; and
after a predetermined time is elapsed, terminate the information disclosure period for the first wireless communication device.

7. A non-transitory storage medium configured to store a computer program that, when executed by a computer incorporated as a portion of a wireless communication device included as a first wireless communication device in a communication group including the first wireless communication device and a second wireless communication device wirelessly connected to the first wireless communication device, performs a method comprising:

storing information identifying the second wireless communication device;

receiving a disclosure signal transmitted from said second wireless communication device;

initiating an information disclosure period in response to receiving an indication of a user operation on the second wireless communication device, wherein the received disclosure signal includes the indication of the user operation;

determining, after receiving a connection request from a third wireless communication device that is not part of the communication group, whether the information disclosure period has ended;

disclosing the information identifying the second wireless communication device to the third wireless communication device based, at least in part, on the determination of whether the information disclosure period has ended; and     terminating the information disclosure period when a connection process between said second wireless communication device and said third wireless communication device reaches a predetermined stage.

8. A wireless communication method comprising steps of receiving, by a first wireless communication device in a communication group, wherein the communication group includes the first wireless communication device and a second wireless communication device wirelessly connected to the first wireless communication device, information identifying the second wireless communication device;

storing the information identifying the second wireless communication device on a storage medium;

initiating an information disclosure period in response to receiving an indication of a user operation on the second wireless communication device, wherein a disclosure signal transmitted from said second wireless communication device includes the indication of the user operation;

receiving a connection request from a third wireless communication device that is not part of the communication group;

determining whether the information disclosure period has ended;

disclosing the information identifying the second wireless communication device to the third wireless communication device based, at least in part, on the determination of whether the information disclosure period has ended; and     terminating the information disclosure period, when a connection process between said second wireless communication device and said third wireless communication device reaches a predetermined stage.

9. A wireless communication system comprising:

a first wireless communication device; and a second wireless communication device forming a same communication group as the first wireless communication device, wherein the first wireless communication device is configured to transmit a signal to the second wireless communication device upon detecting a user operation for making a connection to a third wireless communication device that is not part of the communication group, and wherein the second wireless communication device includes a communication unit configured to receive a disclosure signal transmitted from said first wireless communication device, a storage unit configured to store information identifying the first wireless communication device, and a control unit configured to:

initiate an information disclosure period in response to receiving an indication of a user operation on the first wireless communication device, wherein the disclosure signal received by the communication unit includes the indication of the user operation;

determine whether the information disclosure period has ended;

disclose to the third wireless communication device, the information identifying the first wireless communication device based, at least in part, on the determination of whether the information disclosure period has ended; and     terminate the information disclosure period, when a connection process between said first wireless communication device and said third wireless communication device reaches a predetermined stage.

\* \* \* \* \*